June 5, 1951 J. J. SWARTZ 2,555,616
MILLING FIXTURE FOR AUTOMATIC CHUCKING MACHINES
Filed July 30, 1947 2 Sheets-Sheet 1

INVENTOR
JAMES J. SWARTZ
BY
ATTORNEYS

June 5, 1951  J. J. SWARTZ  2,555,616
MILLING FIXTURE FOR AUTOMATIC CHUCKING MACHINES
Filed July 30, 1947  2 Sheets-Sheet 2
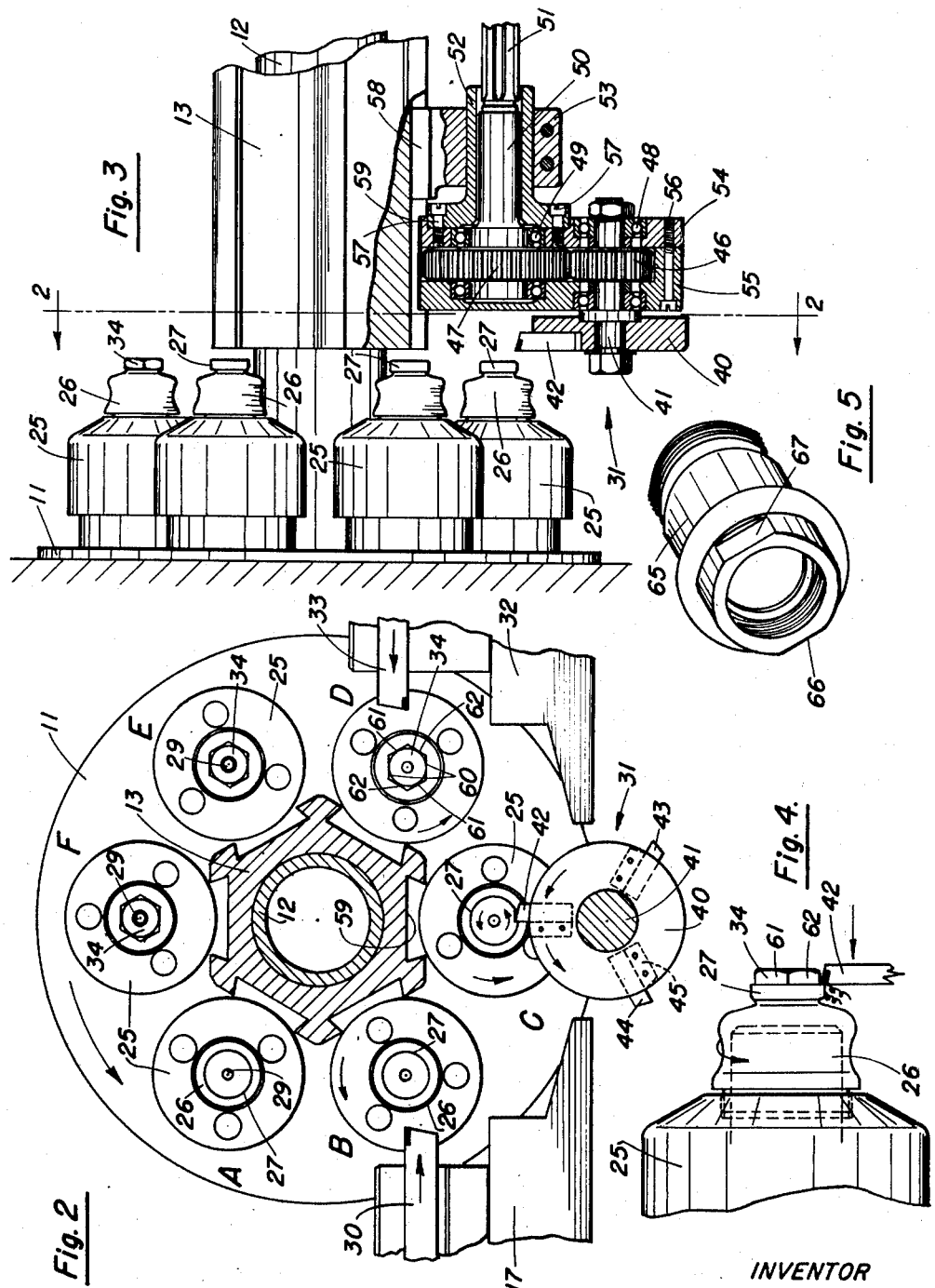
INVENTOR
JAMES J. SWARTZ
BY Parker + Carter
ATTORNEYS Patented June 5, 1951

2,555,616

UNITED STATES PATENT OFFICE 2,555,616

MILLING FIXTURE FOR AUTOMATIC CHUCKING MACHINES

James J. Swartz, Berwyn, Ill., assignor to Sloan Valve Company, Chicago, Ill., a corporation of Illinois Application July 30, 1947, Serial No. 764,623

2 Claims. (Cl. 29—57)

This invention relates in general to automatic chucking machines and particularly to machines having an indexible spindle carrying a plurality of work rotating chucks, together with a plurality of rotatable and endwise movable tools adapted to simultaneously perform work on metal parts at the different indexed positions.

The principal object of the invention is to provide a new and improved mechanism or fixture for an automatic chucking machine in which nuts or flat sides are produced upon a blank metal part supplied to the machine.

It is a further object of the invention to provide a new and improved automatic chucking machine and milling fixture mechanism in which a metal part having a nut blank formed thereon is worked upon in different indexed positions and is arranged to have a nut cut from the nut blank in one of the positions of the machine.

An important feature of the invention resides in the provision and arrangement of a novel cutting tool and attachment for milling nuts, having several cutting blades which revolve at a greater speed than that at which the nut blank is rotating and in the same direction thereof, and in which the cutting tool is fed progressively in tangential contact with the blank nut, milling oppositely disposed flat surfaces to form the nut as the cutting tool and nut are simultaneously rotating.

Another object resides in a novel method and manner of machining a plurality of oppositely disposed flat surfaces on a metal part by rotating a metal blank at a certain speed and direction, rotating a cutting tool at a relatively greater speed than the blank and in the same direction thereof, and then feeding the cutting tool progressively into tangential contact with the nut blank as the tool and nut are simultaneously rotating.

The foregoing objects and other advantages not specifically enumerated and consisting in certain novel features and details of construction, combinations and arrangements of parts, will be apparent from the detailed description of the invention and as set forth in the appended claims.

The accompanying sheets of drawings illustrate a preferred embodiment of the invention wherein:

Fig. 2 is a view of a portion of the machine and mechanism looking toward the spindle carrier end along the line 2—2 of Fig. 3;

Fig. 3 is a side view of Fig. 2 partly in section;

Fig. 4 is a view showing a step in the process of cutting nut blanks on a metal part, and Fig. 5 is a perspective view of a part having opposite flat sides milled thereon.

Figure 1:
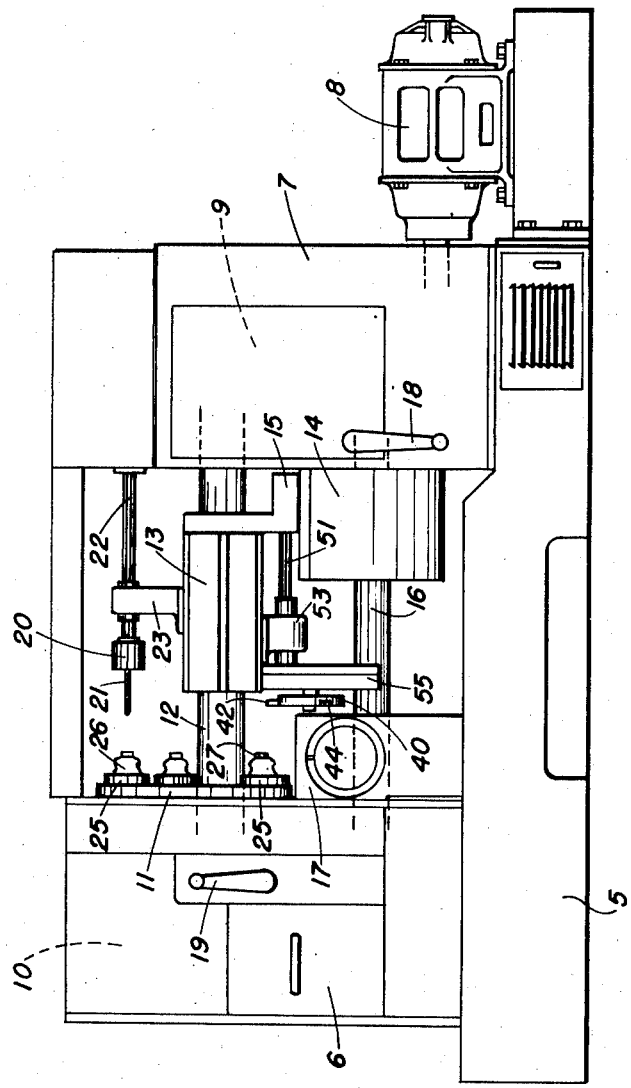
Fig. 1 is a side view of an automatic chucking machine showing the invention applied thereto.

While the invention is applicable to many known types of automatic chucking machines, it lends itself particularly well to such well known machines as are manufactured by the New Britain Machine Company, New Britain, Connecticut. These are generally known as the Model #65 New Britain Automatic Chucking and Work Rotating Machines, and are arranged to progressively perform work on various metal parts. Since the detailed construction and operation of the machines are generally well known to those skilled in the art, it has not been thought necessary to illustrate or point out all the detailed elements or operating features except as they affect the operation and association of the elements with which the present invention is concerned.

Referring now to the drawing, Fig. 1, this shows a front view of an automatic chucking machine embodying the invention and includes a supporting base 5 usually enclosing a chip conveyer, and having vertical side enclosures and supports 6 and 7. An electric driving motor 8 for the machine is also supported on base 5 and drives a series of gears located within the power box 9 for operating the various elements of the machine. On the left hand side, the indexing mechanism 10 for positioning the spindle carrier 11 is located, and the drive shaft for this mechanism passes axially through the tool slide sleeve 12 from the enclosure 7 to 6. Slidably arranged on the tool slide sleeve 12 is a tool slide 13 adapted to be moved laterally towards the spindle carrier 11 by the tool slide drum cam 14 through the medium of the tool slide bracket 15. The tool slide cam 14 is driven by a shaft 16 from the gearing in power box 9 which shaft also serves to provide the motive power for a number of cross slide tools such as 17. Manual control of the machine is provided by the clutching lever 18 which connects the driving motor 8 with the gearing 9 and thereby controls the various tools, and the indexing lever 19 for controlling the manual indexing of the spindle carrier 11.

As is the usual practice, the tool slide 13 supports a number of tools, each of which is adapted to rotate and perform a different operation on the work pieces held in the six different positions or stations A to F inclusive, of the spindle carrier 11. For the purposes of exemplification, a drill speeder has been shown supported in one of the positions on the tool slide. This arrangement includes a chuck 20 holding a threading tap 21 driven by the spline shaft 22 and supported on the tool slide 13 by tool holder 23. Similarly, other tools for performing drilling, forming or boring operations may be carried by the tool slide 13.

The spindle carrier 11 usually carries a series of six chucks 25 as illustrated more clearly in Fig. 2, and each chuck is adapted to hold a piece part, such as 26 for example, upon which work is to be performed. The spindle carrier 11 is indexed or rotated counter-clockwise so as to carry the chucks 25 and parts 26 sequentially through each of the six different positions or stations A to F inclusive. In the first or A position at the commencement of the machine operation, the piece part 26 is loaded or placed on the chuck 25 by the person operating the machine. The lever 19 is then operated to index the spindle carrier 11 to rotate the chuck 25 to the next position or position B, where the front cross slide 17 advances its cutting tool 30 on the work automatically to conduct a forming operation for example, on the body of piece part 26. In the next position C the operation concerned with the present invention is conducted, and this is the cutting of a nut 34 on the top portion 27 of the body of piece part 26, by the fixture or mechanism indicated generally by the reference character 31, as will be more fully explained hereinafter. When the spindle carrier next has indexed the part 26 to position D, the lower rear cross slide 32 operates its forming tool 33 forward to perform another operation on the body of piece part 26. In the E position, a counter bore is made in the bore 29 of the nut 34 while in the upper or F position, the drill speeder 21, Fig. 1, taps and threads the bore 29 in the nut 34. The finished piece part 26 is unloaded from the chuck 25 when it is finally indexed again to position A and another part is then inserted.

After the indexing of the piece part 26 in each of the various positions, the tool slide 13 moves endwise to the left each time to carry the various rotatable tools into operative engagement and cutting relationship with the piece parts to be worked upon.

It is well known that various types of machines have been previously designed for automatically making hexagonal nuts per se from either nut blanks or a length of hexagonal rod, and that milling machines can be arranged to simultaneously cut two oppositely disposed flat sides on a nut blank at one time, after which the nut blank is indexed to cut another pair of flats. All these arrangements, however, require separate and distinct operations and machines for specifically forming or cutting the nuts when the nut is an integral part of a piece part including a body portion, resulting in added production expense and increased loss of time in fabrication. It has been uneconomical therefore with these prior machines to produce hexagonal nuts or parts having flat sides upon the body portion of a piece part. Another factor is that the body portion of the piece part, with which the nut is usually integrally cast, is often of an irregular or round shape and of a different size than the nut, rendering it difficult to hold the body portion of the part in the machine while the flat sides of the nut are being milled by the cutting tool. Such an example is the cover or cap for flush valves used on water closets which requires the formation of a hexagonal nut on the top of the cover in order to screw the cover onto the flush valve body. This cover, as shown clearly in Fig. 4, comprises a body portion of cylindrical shape, having a threaded portion on its lower end and a nut blank formed integrally on top of the cap, which nut is also tapped for the admission of an adjusting screw for adjusting the flush valve. It was customary to perform the finishing operations on the body of this cover in one type of machine and then transfer the part of a milling machine to mill or cut the hexagonal nut on the cover.

In accordance with the present invention, the foregoing disadvantages have been over-come by the novel method and apparatus herein disclosed, whereby hexagonal nuts are economically and rapidly formed without a loss of time by only a single operation in one of the indexed positions of an automatic chucking machine. Simultaneously therewith, various other operations are performed on the body of the piece part with which the nut is integrally associated.

Referring now more particularly to the drawings, Figs. 2 and 3, the fixture or mechanism indicated generally by the reference character 31 is adapted to automatically mill a hexagonal nut on the piece part or cover 26 from a nut blank 27 formed on the body. When the blank nut 27 is indexed to the C position, it is of circular form as shown, and after it leaves this position and has the work performed upon it, it is indexed to the D position with the six flat sides milled in it in the form of the nut 34.

The mechanism 31 is arranged in the automatic chucking machine opposite the third or C position of the spindle carrier 11, and on the tool slide 13. It includes a circular tool holder 40 securely attached or bolted as shown, for rotary motion to the shaft 41, and is provided in the example with three sets of cutting tools 42, 43 and 44, which are clamped in the usual manner by the clamps 45 to the holder 40. The tool holder shaft 41 is splined to a gear 46, which gear in turn is driven by a larger gear 47, both gear shafts being provided with ball bearings 48 and 49. The gear 47 is attached to shaft 50 which is part of the splined shaft 51 extending into the power box 9 where the motive power for turning the shaft 51 originates. The shaft 50 turns in sleeve shank 52, rigidly clamped as by bolts to the tool holding member 53, which member serves to carry the complete fixture 31. The gears 46 and 47, as well as the associated ball bearings 48 and 49, are clamped between a pair of plates 54 and 55 by suitable bolts such as 56, extending through opposite sides thereof and the whole mechanism is supported by bolts 57 from the shank 52. The tool holding member 53 is clamped at the top in well-known manner at 58 to the lower angular slot 59 formed in the tool slide 13. In this manner, the entire fixture 31 is rigidly supported from the tool side and controlled thereby.

In the example illustrated, the gear ratio between the small gear 46 and large gear 47 is exactly two to one, and it will be noted that the axis of rotation of gear 47 and shaft 50 is coincident and directly in line with the axis of the chuck 25, the piece part 26 and the nut blank 27, in the lowermost indexed position C of the spindle carrier 11. The speed of rotation of the chuck and piece part 26 is exactly the same as that of shaft 50, and since the tool holder 40 is attached to gear 46, the tool holder will rotate at a speed twice or double that of the nut blank 27. The direction of rotation of the chuck 25 and therefore the nut blank 27 is counter-clockwise, as shown by the arrows in Fig. 2, and the tool holder 40 also rotates in the same counter-clockwise direction. However, since the rotative axis of the nut blank 27 is displaced in a different plane but parallel to that of the axis of rotation of the tool holder 40, it will be obvious that as viewed in Fig. 2, the cutting tool 42 will be moving tangentially against the periphery of the nut blank 27 and in the opposite direction thereof at the point of contact.

Assume now in the sequence of operations that the spindle carrier 11 has indexed a piece part 26 carrying a blank nut 27 to position C, as viewed in Fig. 2, and that these parts are rotating in a counter-clockwise direction, as indicated. The tool slide 13 will then operate to move the fixture 31 inward or to the left as seen in Fig. 3, and the drive shaft 51 being operated continuously, the tool holder 40 will also be rotating in the same counter-clockwise direction. As the mechanism 31 is moved toward the spindle carrier, the rotating cutting tools 42, 43 and 44 will gradually approach and tangentially assume a cutting position with relation to the nut blank 27. Tool 42 will cut or mill a flat shaving from the nut blank 27 as the tool tangentially contacts the surface of the nut blank, and as it is rotating past it, while simultaneously the nut blank is turning in the opposite direction at the point of contact therewith. When the next cutting tool 43 contacts and mills the nut blank 27, the flat portion previously cut by the tool 42 will have moved in a counter-clockwise direction the distance equivalent to one of the flat sides of a hex nut. When cutting tool 44 subsequently contacts the surface of nut blank 27, it will mill a flat piece in the next portion of the nut blank following that milled by tool 43. Subsequently cutting tool 42 will again mill the surface of the nut blank 27, but at this time the nut blank will have turned or rotated a distance of 180 degrees and presented its opposite side for cutting from that which the cutting tool 42 first contacted and milled.

As the nut blank 27 and tool holder 40 continue to simultaneously rotate, the cutting tools 42, 43 and 44 progressively cut deeper into the sides of the nut blank as the tool slide 13 moves the tool holder 40 inward, each of the cutting tools continuing to cut upon the same oppositely disposed flat sides on the nut blank 27 until the limit of the progressive movement has been reached and the tool slide 13 is stopped. This progressive milling operation is partially shown in Fig. 4 where the cutting tool 42 is shown in the act of cutting into the nut blank 27. As shown in the position D, Fig. 2, the finished nut 34 has been provided with hexagonal milled sides, with the cutting tool 42 having cut the two oppositely disposed flat sides 60 on the nut, the cutting tool 43 the flat sides 61, while the cutting tool 44 has cut the opposite flat sides 62.

As pointed out, the speed of rotation of the tool holder 40 is twice that of the nut blank 27 and therefore with the three cutting tools shown, the hexagonal flat sides are thereby cut. It will be obvious therefore that if only one tool 42 were provided on the tool holder 40, and with the same speed and gear ratio present, only a single pair of oppositely disposed flat sides would be cut on the blank nut 27. Also to mill a hexagonal nut with only one cutting tool, it would be necessary to increase the speed of rotation of the tool holder 40, six times that of the speed of the work part 26. However, this high rate of speed would be impractical for commercial use. It will also be obvious that by varying the speed of rotation of the blank nut and tool holder 40, various multiples of 2, 4, and 6 flat sides could be cut on a piece part, or by varying the number of tools on the tool holder a variable number of flat sides could be milled.

Although the mechanism 31 has been illustrated as shown in connection with the production of hexagonal nuts 34 on a piece part 26, it will be understood that other objects may be formed with oppositely disposed flat parts for various other purposes. For example, Fig. 5 shows what is commonly known as a vacuum breaker for use in plumbing fixtures. This comprises a cylindrical body 65 provided with internal and external screw threads for connection to suitable piping and fittinngs, and in order to assemble the same, it must be provided with oppositely disposed flat surfaces 66 and 67 for the accommodation of a wrench. This vacuum breaker may be readily machined and milled with the flat sides on the fixture 31 disclosed by this invention, by choosing the correct rotational speed and number of cutting tools.

From the foregoing description, it will be seen that applicant has designed a novel fixture and mechanism as well as a method for forming or cutting flat sides on irregular shaped objects which may be placed into an automatic chucking machine and simultaneously have various other operations performed on them in the several indexed positions of the machine, and while only one embodiment of the invention has been illustrated and described, it will be understood that other variations of the same may be evolved by those skilled in the art. It is therefore desired that the invention be not limited to the precise disclosure but only to the extent of the appended claims.

What is claimed is:

1. In a fixture for use on an automatic chucking machine in which the chucking machine is arranged to index a part to be worked upon to a certain position and then to rotate the part in the said position, a plurality of cutting tools, a rotatable cutting tool holder around which said cutting tools are disposed and supported with their cutting edges projecting outward, means for rotating said cutting tool holder at a different rotary speed from the part to be worked upon and in the same direction of rotation, said cutting means having its rotating axis arranged parallel to the rotating axis of said part, a driving gear for said cutting means arranged on the same shaft thereof, a power gear for rotating said driving gear arranged in axial alignment with said part, a housing for both of said gears, said cutting means arranged on one side of said housing, a power shaft for said driving gear extending from the opposite side of said housing, the rotational speed of said driving gear being the same as that of said part, and means for progressively moving said tool holder towards said part whereby said rotating cutting tools are advanced tangentially along the sides of said part and thereby cut flat sides thereon, said part being worked upon rotating in the same direction and at the same rotational speed as said driving gear.

2. In a fixture for use on an automatic chucking, indexing, and work rotating machine, a rotatable cutting tool holder, a plurality of cutting tools disposed in equal spaced relationship around said tool holder with their cutting edges projecting outward, means for rotating said cutting tool holder at a speed greater than the speed of rotation of the part being worked upon in the machine, said cutting tool holder and said part being arranged on parallel axis of rotation and rotating in the same direction, a driving gear for said cutting means arranged on the same shaft thereof, a power gear for rotating said driving gear arranged in axial alignment with said part, said power gear rotatable at the same speed as that of said part, a housing for both of said gears, said cutting means extending from one side of said housing, a power shaft for said power gear extending from the other side of said housing and in axial alignment therewith, and means for progressively moving said cutting tool holder towards and along the sides of said part with said cutting tools in tangential contact with the part, said cutting tools rotating in the opposite direction from the work at the point of contact therewith, whereby two oppositely disposed flat sides are cut on said part by each of said cutting tools, the part being worked upon rotating in the same direction and at the same rotational speed as said driving gear.

JAMES J. SWARTZ.

REFERENCES CITED

The following references are of record in the file of this patent:

UNITED STATES PATENTS

| Number | Name | Date |
|---|---|---|
| 469,813 | Dahlgren et al. | Mar. 1, 1892 |
| 633,108 | Pearson | Sept. 12, 1899 |
| 1,485,687 | Melling | Mar. 4, 1924 |
| 1,531,565 | Melling | Mar. 31, 1925 |
| 2,033,490 | Simpson et al. | Mar. 10, 1936 |
| 2,423,696 | Fink | July 8, 1947 |